(12) United States Patent
Chang et al.

(10) Patent No.: US 6,638,698 B2
(45) Date of Patent: Oct. 28, 2003

(54) METHOD FOR FORMING A DIFFUSIVE-TYPE LIGHT REFLECTOR

(75) Inventors: Wei-Chih Chang, Miao Li Hsien (TW); Chi-Jain Wen, Hsinchu (TW); Dai-Liang Ting, Hsinchu (TW)

(73) Assignee: Industrial Technology Research Institute (TW)

( * ) Notice: Subject to any disclaimer, the term of this patent is extended or adjusted under 35 U.S.C. 154(b) by 171 days.

(21) Appl. No.: 09/776,739

(22) Filed: Feb. 5, 2001

(65) Prior Publication Data

US 2001/0004513 A1 Jun. 21, 2001

Related U.S. Application Data

(63) Continuation-in-part of application No. 09/288,963, filed on Apr. 9, 1999, now Pat. No. 6,291,146.

(51) Int. Cl.⁷ .......................... G03C 5/00; G02B 13/00; G02F 1/1335
(52) U.S. Cl. .......................... 430/394; 349/64; 349/112; 349/113; 359/15; 359/599
(58) Field of Search ................. 430/394, 321; 349/64, 113, 112; 359/599, 15

(56) References Cited

U.S. PATENT DOCUMENTS 6,163,405 A * 12/2000 Chang et al. ................ 359/599
6,291,146 B1 * 9/2001 Chang et al. ................ 430/394

* cited by examiner

Primary Examiner—Shean C. Wu (57) ABSTRACT

The invention provides a method for fabricating diffusive-type light reflector which is a substrate having a plurality of bumpy elements with reflective curved surfaces. Each of the plurality of bumpy elements has a first surface and a second surface, the first angle ($\alpha$ or $\theta$) between the first surface and the substrate is different from the second angle ($\beta$ or $\phi$) between the second surface and the substrate. A slit-width-adjusting mask is proposed for manufacturing the curved reflective elements in one exposing step according to the present invention. The slit-width-adjusting mask includes a plurality of slit areas. The first transparent slit area under defocus exposure has the first exposure p1, and the second transparent slit area has the second exposure q1. Each transparent slit area has the same area and is of the width p2, the first transparent slit area is of the width p2, and the second transparent slit area has the width q2. The first exposure p1 is greater than the second exposure q1, and $(q2)/(p2)=(q1)/(p1)$. The invention can also be used in a diffusive-type light reflector TFT-LCD, as the reflector element between the liquid crystal layer and the active matrix.

17 Claims, 9 Drawing Sheets

METHOD FOR FORMING A DIFFUSIVE-TYPE LIGHT REFLECTOR

This is a continuation-in-part application U.S. Ser. No. 09/288,963 filed on Apr. 9, 1999 now U.S. Pat. No. 6,291,146 B1.

BACKGROUND OF THE INVENTION

1. Field of the Invention

The instant invention relates to an apparatus for diffusing external light, such as that from a reflective TFT-LCD (Thin Film Transistor-Liquid crystal display), into a desired solid angle, which can be deviated from the unpleasant high intensity specular ray usually produced by the covering glass on the LCD.

2. Description of the Related Art

Figure 1:
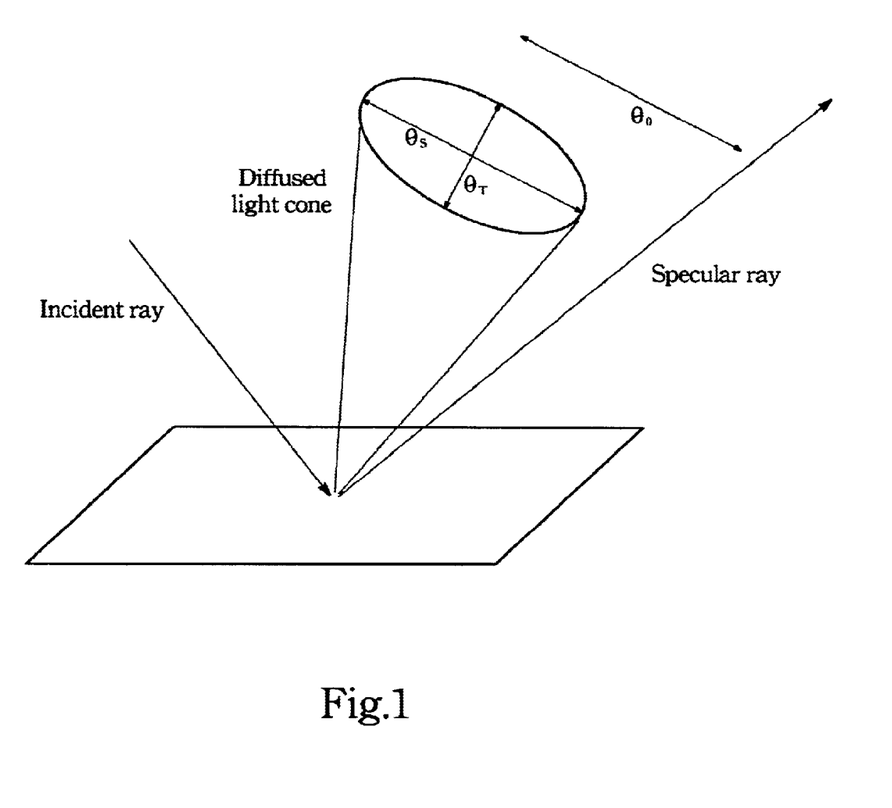
FIG. 1 is a diagram illustrating relevant optics terms and variables used in the specification.

To facilitate later discussion, we first define the optics terms and variables that shall be used, as shown in FIG. 1. An incident plane is the plane containing the incident ray and the normal direction of the reflection point. A specular ray is defined as the reflected light ray on the incident plane whose reflected angle is equal to the incident angle. The light cone subtended by the diffused light is called a diffused light cone. Define the distribution angle of the diffused light cone in the incident plane as the vertical diffusion angle, $\theta_S$, and that perpendicular to the incident plane as the horizontal diffusion angle, $\theta_T$. A deviation angle $\theta_0$ is the angle between the specular ray and the central ray in the diffused light cone.

Traditional reflective light diffusing elements, such as diffusive films (e.g., the Poloroid Holographic Reflector and Sumitomo Lumisty) or bump reflectors (e.g., U.S. Pat. No. 5,610,741 and R.O.C. Patent No. 255,019), cannot simultaneously achieve the goals of controlling the size of the diffused light cone, directing the reflected light distribution away from the specular ray, keeping the resolution power, and preventing color dispersion. However, for certain applications, the specular ray reflected by the covering glass is undesired because it is glare of the virtual image of the light source, and also, owing to the user's viewing angle, one side of the usual diffused light cone around the specular ray will be useless. Since the efficiency of usual reflective TFT-LCDs is already as low as 10%, extra waste of diffused light will demand a stronger external light source and thus cause the reflective TFT-LCD to be even more unpractical than at present. Therefore, effectively controlling and smoothly distributing diffused reflected light within a specific solid angle to yield higher intensity and a more thorough use of reflected light from a reflective liquid crystal display (LCD) will be of great practical value.

One way to improve the above situation is by combining a diffusive film with a slant reflector structure. Although a diffused reflective light away from the specular ray can be achieved in this way, this method obviously increases the structure cost and, as a drawback of usual diffusive films, decreases the resolution of the LCD and causes the color dispersion problem.

Furthermore, an additional approach is to employ a mask being composed of areas having different transparencies to fabricate the slant reflector structure that is utilized in the LCD to avoid the resolution decrease and the color dispersion issue. Because the mask composed of areas having different transparencies is very expensive, the cost of the fabricated LCD is too much. So it is necessary to propose the other method without utilizing the mask composed of areas having different transparencies to fabricate the slant reflector structure employed by the LCD.

SUMMARY OF THE INVENTION

An object of the invention is to provide a diffusive-type light reflector which can reflect and diffuse incident light to a desired solid angle with required intensity uniformity and without degradation of display quality.

The invention provides a method for fabricating a diffusive-type light reflector which is a substrate having a plurality of bumpy elements with reflective curved surfaces. Each of the plurality of bumpy elements has a first surface and a second surface, the first angle ($\alpha$ or $\theta$) between the first surface and the substrate being different from the second angle ($\beta$ or $\phi$) between the second surface and the substrate.

A method for fabricating diffusive-type light reflector is proposed by the present invention. The diffusive-type light reflector is used for scattering incident light into a predetermined angular area away from specular ray. The method includes the following steps. First, a photoresist layer is formed on a substrate followed by exposure of the photoresist layer under defocus exposure through a slit-width-adjusting mask proposed by preferred embodiment of the present invention. The slit-width-adjusting mask includes a plurality sets of slits, each set of slits includes several portions, each portion is of the width p2. In addition, each portion includes a slit. The first portion under light source of the defocus exposure has a first exposure p1, and a second portion under light source of the defocus exposure has a second exposure q1. The transparent area within the second portion has width q2, the first exposure p1 is greater than the second exposure q1, and $(q2)/(p2)=(q1)/(p1)$.

Then the photoresist layer is baked followed by development of the photoresist layer to form a photoresist pattern. The photoresist pattern includes a plurality of bumps, each of the plurality of bumps includes a first surface and a second surface, the first surface having a longer slant than that of the second surface. A first angle $\phi$ between the first surface and the substrate is unequal to a second angle $\theta$ between the second surface and the substrate.

Subsequently, a reflective layer is formed on the photoresist pattern, with the normal direction of the first surface pointing to a predetermined direction enabling reflective light of the incident light reflected by the reflective layer to be scattered into the predetermined angular area.

As described above, according to the invention, each of the first surfaces has a monotonically convex and/or concave curve in the incident plane for scattering incident light into a desired angular area in the incident plane with specific intensity uniformity.

Further, as described above, according to the invention, each of the first surfaces has an irregular curve in the incident plane. Although the curve is irregular, the incident light will still be scattered into a certain angular area in the incident plane, yet the intensity uniformity is not guaranteed because of the irregular surface.

Yet further, according to the invention, each of the first surfaces has a wavy curve in the horizontal plane for scattering light into a desired solid angle with specific intensity uniformity.

Further according to the invention, each of the first surfaces has an irregular curve in the horizontal plane. Again, in spite of the irregularity, the incident light will be scattered into a certain solid angle without the guarantee of intensity uniformity.

Yet further, the invention provides a slit-width-adjusting mask for the photo-exposure procedures for making a diffusive-type light reflector according to the instant invention, wherein the mask comprises an opaque plate with a plurality of regular wavy slits with fixed separation or irregular wavy slits with fixed separation.

BRIEF DESCRIPTION OF THE SEVERAL VIEWS OF THE DRAWINGS

FIG. 6($a$) is an experimental result of light intensity distribution diffused by a curve surface reflector according to the present invention;

FIG. 6($b$) is a schematic diagram showing the ideal viewing angular area;

FIG. 7($a$) illustrates the slit-width-adjusted mask according to one preferred embodiment of the present invention;

FIG. 7($b$) illustrates the corresponding exposure of related position under the slit-width-adjusted mask according to one preferred embodiment of the present invention, in which the exposing system is perfectly focused;

FIG. 7($c$) illustrates the corresponding exposure of related position under the slit-width-adjusted mask according to one preferred embodiment of the present invention, in which is defocused, and FIG. 7($c$) is also the cross-section of the photoresist pattern, which has been exposed to a light source of the exposing system through the slit-width-adjusted mask, and has been developed;

FIG. 7($d$) illustrates the cross-section of the photoresist pattern, which has been exposed to a light source of the exposing system through the slit-width-adjusted mask according to the preferred embodiment of the present invention, and has been developed and baked; this is also the cross-section of the bump according to the present invention;

FIG. 7($e$) illustrates the cross-section of the reflective layer formed on the baked bump, which comprise the reflector proposed by the preferred embodiment of the present invention;

FIG. 10($a$) illustrates the cross-section of the photoresist pattern formed according to the preferred embodiment of the present invention, wherein the photoresist pattern is made of positive photoresist;

FIG. 10($b$) illustrates the plot of the exposure to the photoresist pattern shown in FIG. 10($a$) versus the position of the photoresist pattern according to the preferred embodiment of the present invention;

FIG. 10($c$) illustrates the piecewise simulated plot, which emulates the average exposure of the photoresist pattern versus each section of the position of the photoresist pattern according to the preferred embodiment of the present invention;

FIG. 10($d$) illustrates the cross-section of the slit-width-adjusted mask according to one preferred embodiment of the present invention, wherein the ratio of the oblique region to the transparent region of each sections are illustrated; and FIG. 10($e$) illustrates the cross-section of the slit-width-adjusted mask according to the other preferred embodiment of the present invention, wherein the number of oblique square and the transparent square of each sections are illustrated.

DETAILED DESCRIPTION OF THE INVENTION

In observation of these disadvantages and needs, the present invention proposes a new method that improves the traditional slant reflector in such a manner that the reflective elements can also diffuse reflected light to a predetermined solid angle. First, a specially designed mask is utilized in the exposure process for the photoresist on a substrate. The slits on the mask are carefully arranged and the exposure time is fine-tuned. In addition, the exposure process is defocused so that, after developing and possibly a proper baking procedure, a specific pattern of surface is formed on the substrate. Then a uniform layer of reflective material is applied on the thus-produced. Because of the nonvanishing curvature of those bumpy surfaces, an incident light will be reflected toward a different direction from the specular ray. By changing the curvatures in different tangent directions of the surface, one can readily adjust the solid angle subtended by the thus-diffused light to the required one.

Since no particular diffusive film is used in the present invention, the structural cost is thus lowered. Not only is the resolution retained, but also the reflected light intensity will not be decreased. Furthermore, color dispersion is not a concern in this case. Because the mask utilized in the present invention is not a mask composed of different transparencies, and the multi-exposure process is no longer utilized in the present invention, the cost is reduced and the yield is increased. And one may choose a proper mask and follow the correct steps to make a reflective diffuser suitable for specific uses.

Figures 2A, 2B:
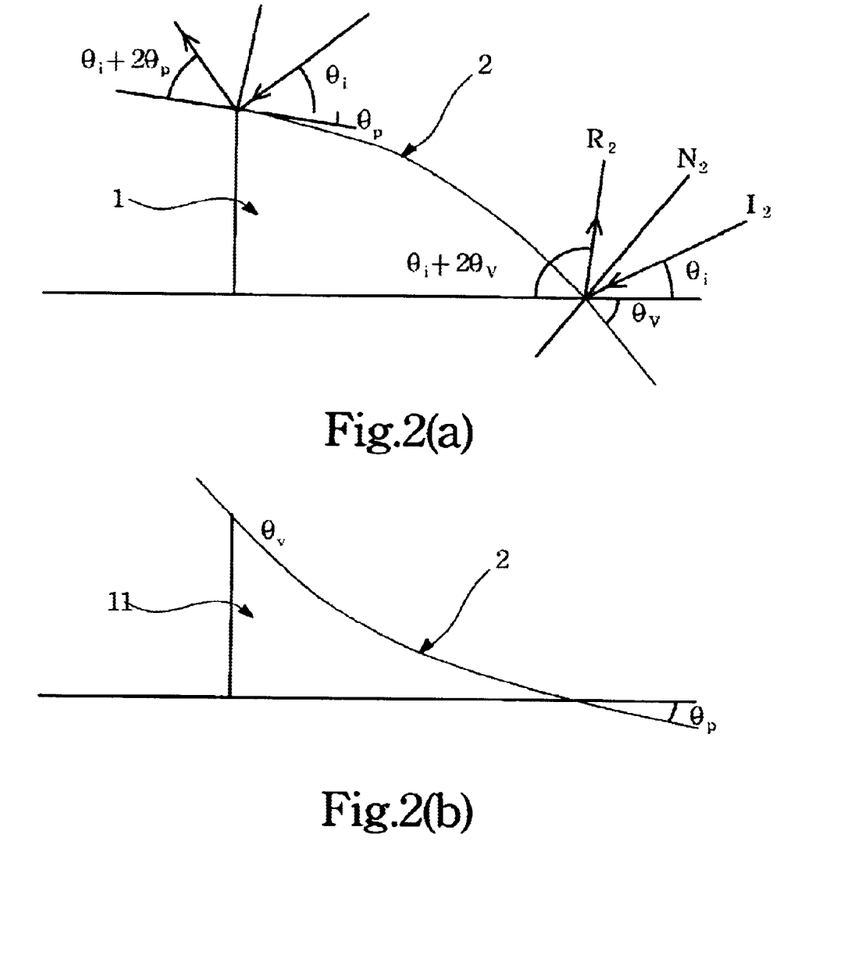
FIG. 2 is a microscopic view of the cross section of one reflective element of a curve slant reflector according to the present invention in the incident plane.
Figure 3:
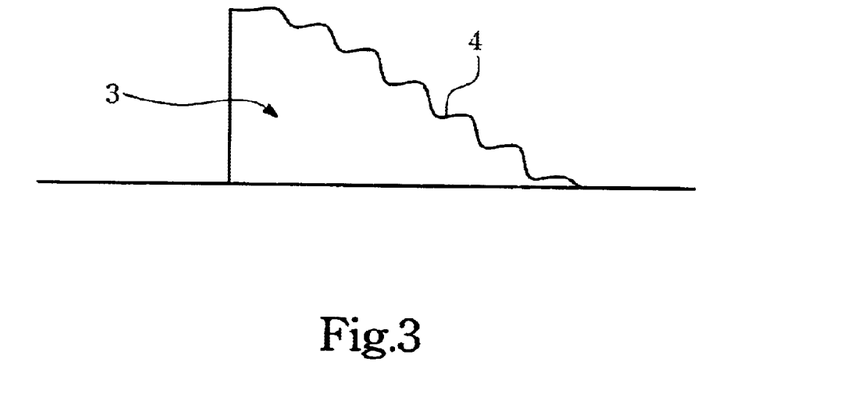
FIG. 3 is a microscopic view of the cross section of one reflective element of an irregular slant reflector according to the present invention in the incident plane.

FIGS. 2 and 3 are two microscopic views of individual reflective element cross sections in the vertical plane, illustrating two ways to achieve the goal of diffusing reflective light in the incident plane. In one preferred embodiment, the whole reflector is composed of a set of such reflective elements aligned parallel to one another.

As shown in FIG. 2, the slant of the reflecting surface 2 of the curve slant reflective element 1 is a monotonically convex curve. No two points on the slant have the same slope. The steepest and smallest slopes occur at the bottom and the top of the slant, respectively. Define the angle between the substrate and the tangent of the smallest slope, in this case at the top of the slant, as $\theta_P$ and that between the substrate and the tangent of the largest slope, in this case at the bottom of the slant, as $\theta_V$. Then, according to the principles of optics, reflected light will be deviated from the specular ray by $2\theta_P$ to $2\theta_V$. Thus, with this kind of reflector, incident light will be reflected and diffused into an angular area $2\theta_V$–$2\theta_P$ deviated away from the specular ray by $2\theta_P$.

One can then adjust these two angles along with the convexity, or equivalently the curvature, of the slant to control the directions of the diffused light to meet practical needs.

If properly shaped, i.e., with the correct $\theta_V$, $\theta_P$ and concavity, even a slant reflector with a monotonically concave slant will achieve the same effect. However, in this case, $\theta_V$ appears at the top of the slant while $\theta_P$ appears at the bottom. However, this kind of structure is harder to obtain because it demands a sharp edge at the top of the slant.

FIG. 3 illustrates an irregular slant reflective element 3. The character of this kind of structure is that the extrema of the slant slope of the reflecting surface 4 do not necessarily appear at the top and bottom of the slant and two points on the slant may have the same slope. Owing to the nature of the irregular structure, incident light rays will be randomly reflected into different directions, but still fall within the angular area $2\theta_P$–$2\theta_V$ controlled by the largest and smallest slopes. The flux intensity of reflected light may not be uniform in all directions.

Figure 4:
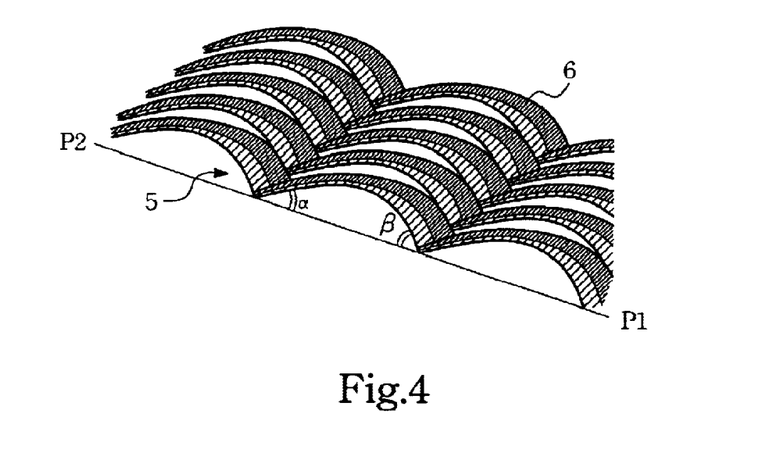
FIG. 4 is a three dimensional perspective of the structure of a curve surface reflector according to the present invention.
Figure 5:
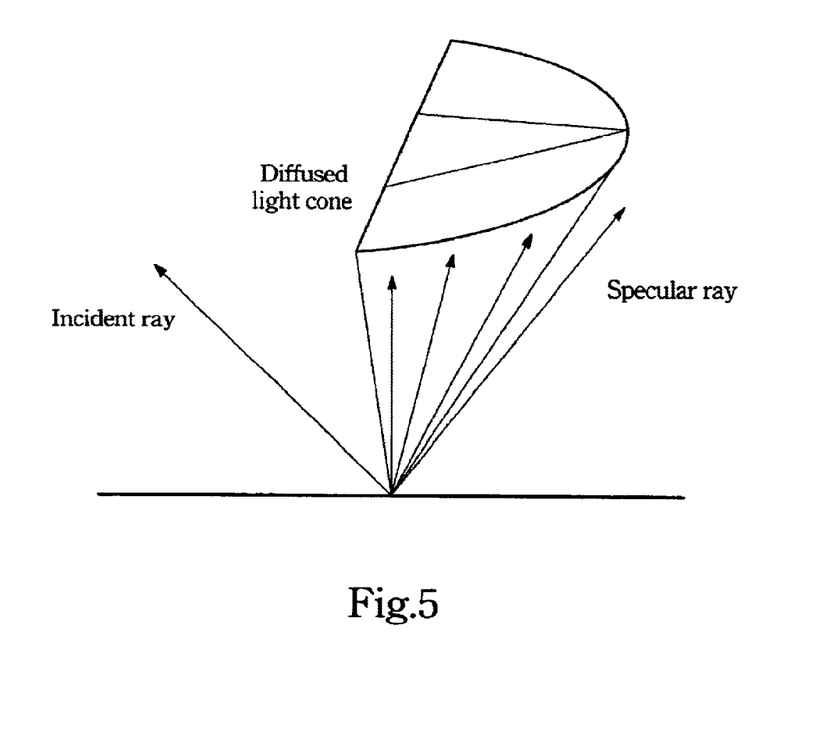
FIG. 5 is a schematic diagram showing the reflection and diffusion of an incident light ray by a curve surface reflector according to the present invention.

A preferred embodiment of the present invention is a curve surface reflector 5, as illustrated by the three dimensional perspective of its structure in FIG. 4. It has the feature that the reflecting surface 6 does not only curve in the slant direction, as in the case of a curve slant reflector, but also curve in the horizontal direction perpendicular to the slant direction. By the same reflecting principle, the incident light rays will be reflected by the curve surface reflector 5 and be scattered into a solid angle, as shown in FIG. 5. The vertical diffusion angle, $\theta_S$, the horizontal diffusion angle, $\theta_T$, and the deviation angle $\theta_0$ (shown in FIG. 1) are controlled by how the reflecting surface is curved and what the extremal slopes in different directions are.

Figure 6A:
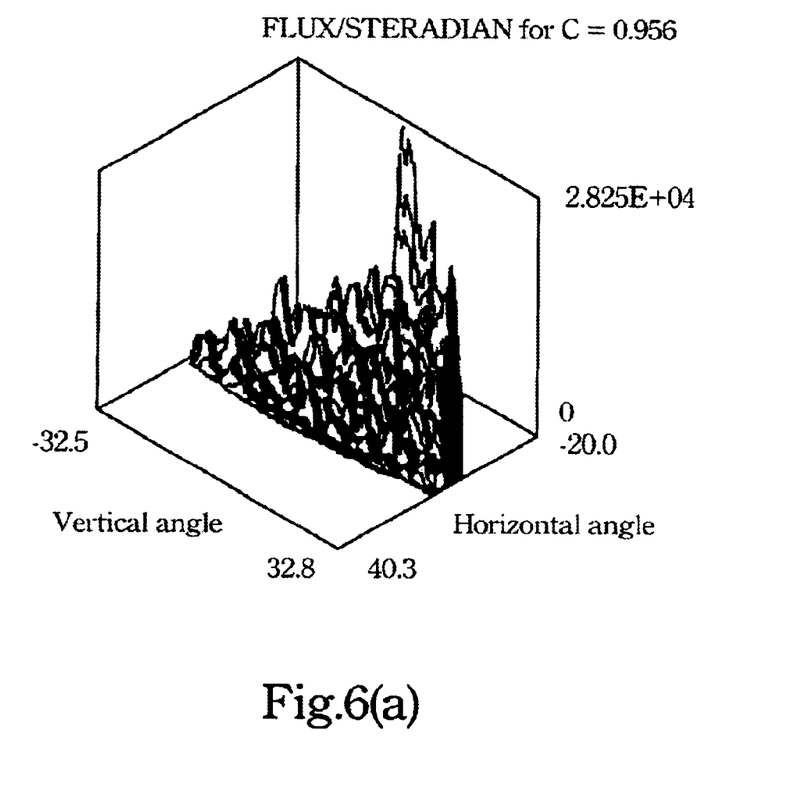
Figure 6B:
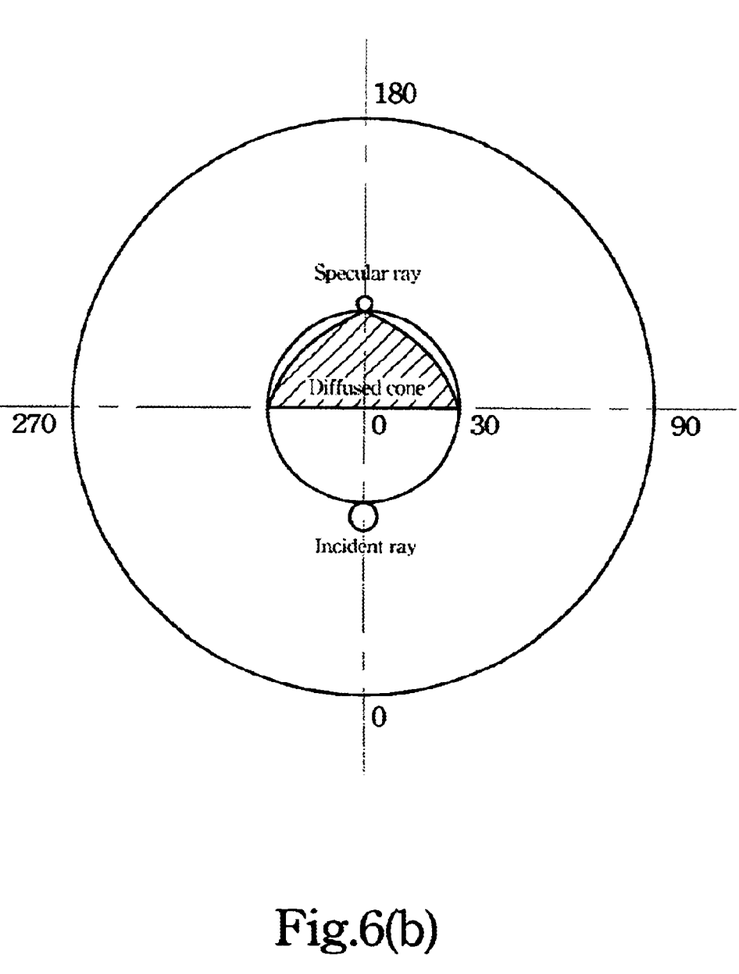

FIG. 6(a) gives the diffused light flux versus the vertical and horizontal diffusion angles as an experimental result of the curve surface reflector 5. FIG. 6(b) delineates a schematic diagram of ideal diffusive light distribution; wherein the lower circle indicates a typical light incident angle, the upper circle indicates the corresponding specular angle, and the shaded triangular area is a solid angular area ideal for user's viewing which is the objective of and is achieved by the present invention, as illustrated in the wedge shape flux distribution in FIG. 6(a).

Figure 7A:
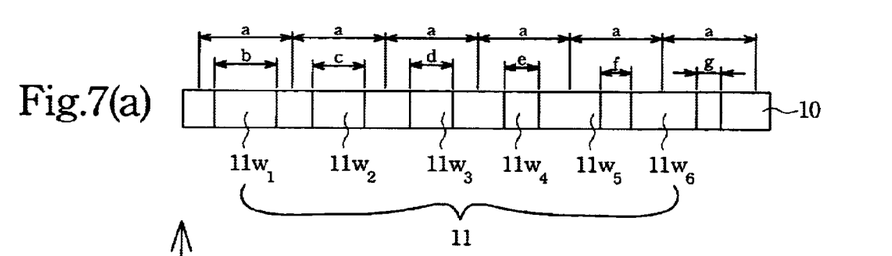

In order to confine the reflected light to the expected solid angular area shown in FIG. 6(b), the present invention proposes a method for fabricating the curve surface reflectors. The present invention specifies the manufacture of the desired reflector using the slit-width-adjusted mask instead of a traditional mask composed of different transparencies in a One-Step-Exposure Method. In the present invention, the width of the slits on the mask are designed by the designer, and each mask includes a plurality sets of slits, there is only one set of slits 11 is shown in FIG. 7(a). As shown in FIG. 7(a), each set of slits 11 may include several slits such as a first slit 11w1, a second slit 11w2, a third slit 11w3, a fourth slit 11w4, a fifth slit 11w5, and a sixth slit 11w6. Each area enclosing each slit has the same width "a", the width of the first slit 11w1 is "b", the width of the second slit 11w2 is "c", the width of the third slit 11w3 is "d", the width of the fourth slit 11w4 is "e", the width of the fifth slit 11w5 is "f", and the width of the sixth slit 11w6 is "g".

Figure 7B:
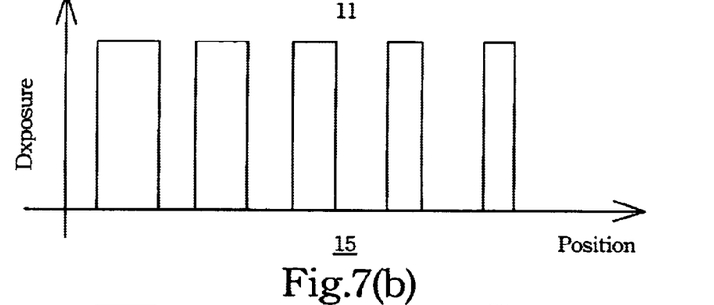

It is illustrated in FIG. 7(a) that the width of the first slit 11w1 is greater than that of the second slit 11w2, similarly c>d>e>f>g. So when a photoresist layer (not shown) is exposed to a light source using the slit-width-adjusted mask 10 as a mask, the plot of position versus exposure is shown as plot 15 in FIG. 7(b). It is noted that the exposure result from each slit is proportional to the width of each slit. When the positive photoresist is used to form the forgoing photoresist layer, after an exposing process using perfect focus and a developing process, the cross sectional view of the resulted photoresist pattern is the same as that shown in FIG. 7(b). In the exposing process mentioned above, the slit-width-adjusted mask 10 is placed above the photoresist layer in an exposing system (not shown), and then the focus of the exposing system is adjusted perfectly.

Figure 7C:
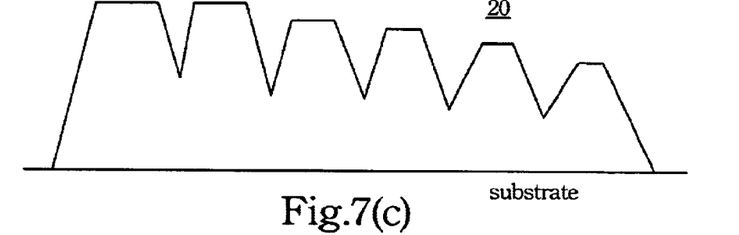
Figure 7D:
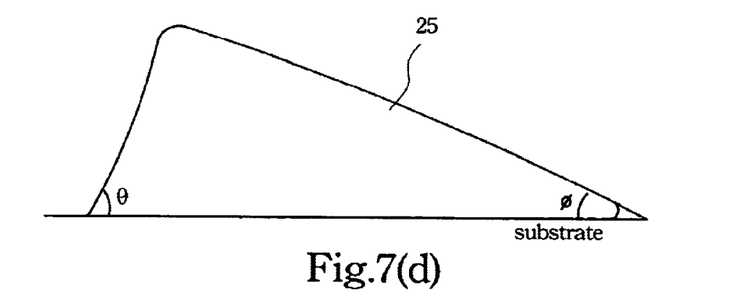
Figure 7E:
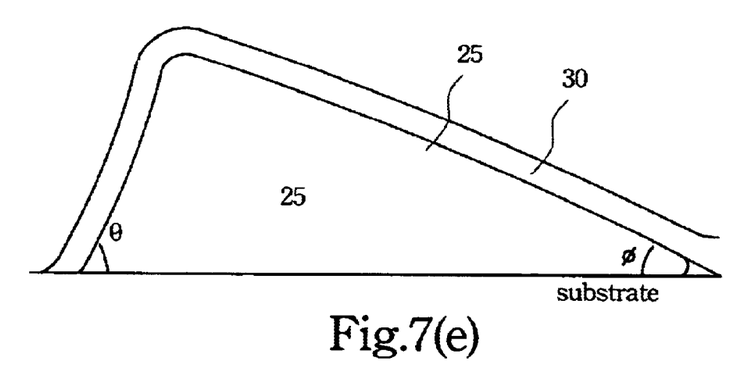
Figure 8:
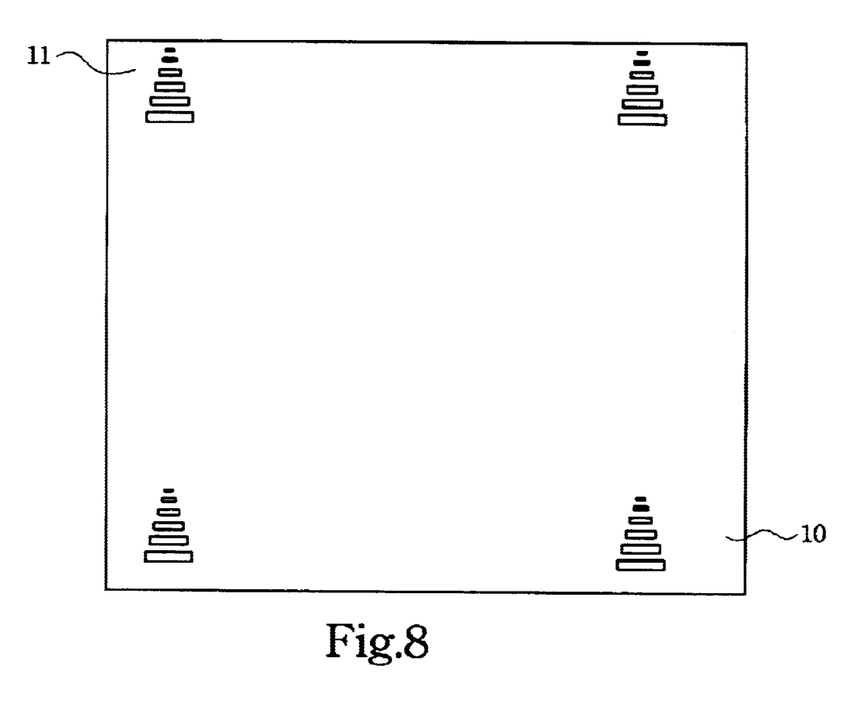
FIG. 8 illustrates the cross-section of the slit-width-adjusted mask utilized to expose the photoresist pattern according to the preferred embodiment of the present invention, wherein the bump shown in FIG. 7($d$) is obtained by exposing and developing the photoresist pattern through each set of the plurality set of slit.

However, when the focus of the exposing system is adjusted to defocus, for example, when the focus of the adjusted exposing system according to the present invention is shorter than the focus of the original exposing system by 5–10 percent, the cross-sectional view of the resulting photoresist pattern 20 is shown in FIG. 7(c). After the defocus exposing process mentioned above, the resulted photoresist pattern 20 is processed by a reflow process, during which the photoresist pattern 20 is baked at the temperature of about 200–300° C. So the photoresist pattern 20 is smoothed and the cross sectional view of the baked photoresist pattern 20 is shown as the baked bump 25 in FIG. 7(d). According to the preferred embodiments of the present invention, the contact angle θ and φ between the surface of the baked bump 25 and the underlying substrate are different. Thus the reflected light can be uniformly reflected and diffused in the expected solid angle mentioned above. The next process, referring to FIG. 7(e), is to form a reflective layer 30 on the baked photoresist pattern (baked bump 25) to form the reflector proposed by the present invention. In addition, the distribution and shape of the baked bump 25 depends on the location and length of the plurality set of slits 11 on the slit-width-adjusted mask 10. When the plurality set of slits 11 are uniformly distributed on the slit-width-adjusted mask 10, for example, an arrangement as shown in the top view of the slit-width-adjusted mask 10 shown in FIG. 8 results. The resulted reflector will be the same as the reflector 5 shown in FIG. 4. However, the length and distribution of the plurality set of slits 11 can be designed as a pattern other than that shown in FIG. 8, each slit can be a long straight or a curved parallel line (such as the slits 24 on the mask 20 shown in FIG. 10 in USSN 09/288,963) across the slit-width-adjusted mask 10. Because the slit-width-adjusted mask 10 is employed in this invention instead of the gray level mask (denoted 45 in FIG. 17 of USSN 09/288,963), one-step-exposure process can be used to fabricate the bump without high cost. Preferably, the under side of the baked bump 25 in the preferred embodiment of the present invention is about 10–50 microns, and the altitude of the baked bump 25 is about 0.5–2 microns.

Figure 9:
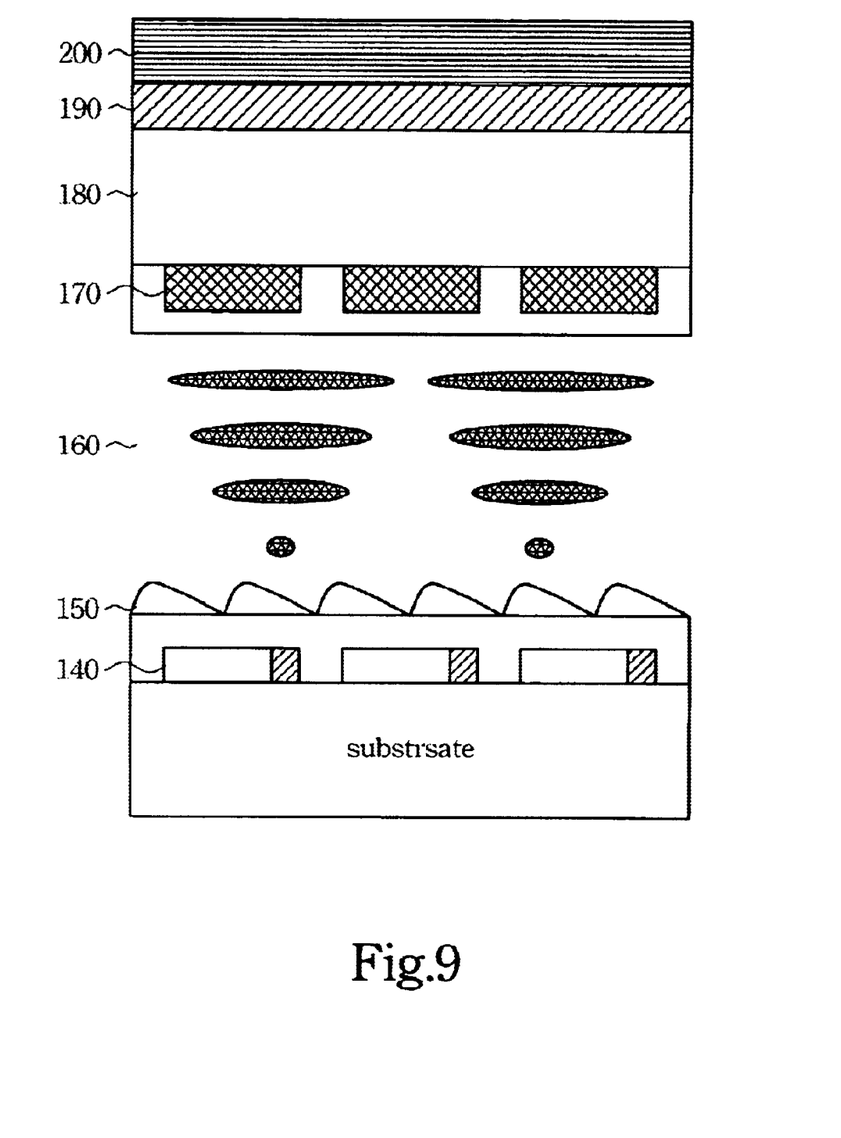
FIG. 9 illustrates the cross-section of a TFT LCD using the reflective type light diffuser (reflector) fabricated by the method proposed by the present invention.

When reflectors according to the present invention are obtained, one can use them as the reflective bases in reflection-type LCDs. An embodiment of a reflection-type TFT-LCD incorporating the technology disclosed herein is demonstrated in the structural cross-section view as shown in FIG. 9. An active matrix 140 is deployed on a substrate. A reflector 150 according to the present invention is then attached onto the active matrix 140 with the same material used as the substrate of the reflector 150 filled in the vacant space. A color filter 170 covers the reflector 150 with LC mode 160 mediated in between. Combined layers of a polarizer 200, a λ/4 film 190, and glass 180 are then connected onto the top surface of the color filter 170.

The distinctive feature of the present invention is that no diffusive material is included for the purpose of diffusing incident light. This goal is simply achieved by the utilization of curved surfaces on the reflective elements. Therefore, no concerns arise as to color dispersion, reflective efficiency, and resolution power. The reflector in the specification of the present invention is the reflection-type diffuser used in the LCD. Since such curved surfaces of the reflector according to the present invention are properly tuned, they also possess the ability to scatter incident light to a specific solid angle demanded by the practical application. Thus, these advantages, when applied to reflection-type TFT-LCDs in place of traditional methods, greatly lower the cost of manufacture and enhance the performance of the product. Particularly, because the one-step-exposure process is employed without using gray level masks, the cost is reduced.

Figure 10A:
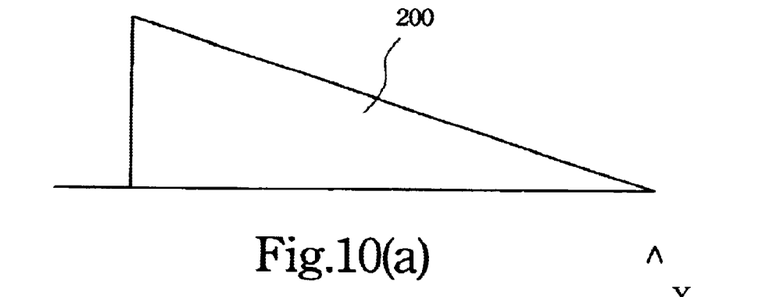
Figure 10B:
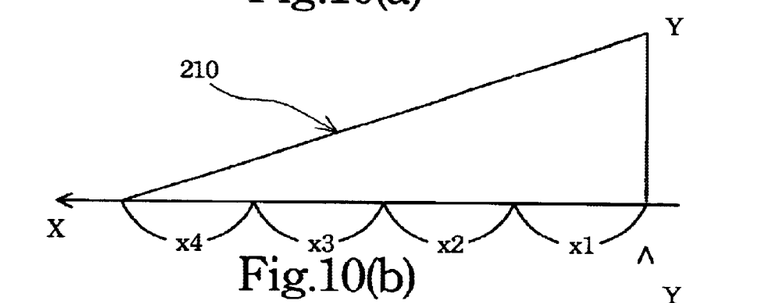
Figure 10C:
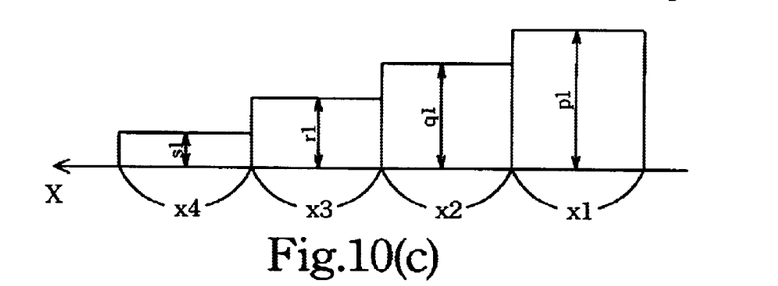
Figure 10D:
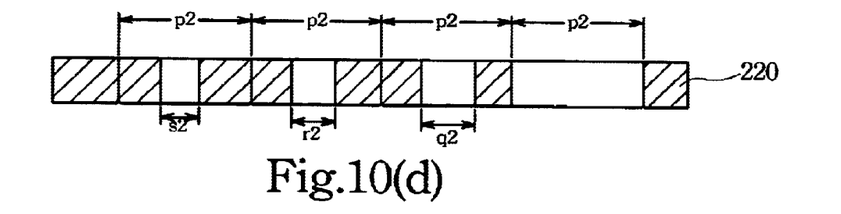
Figure 10E:
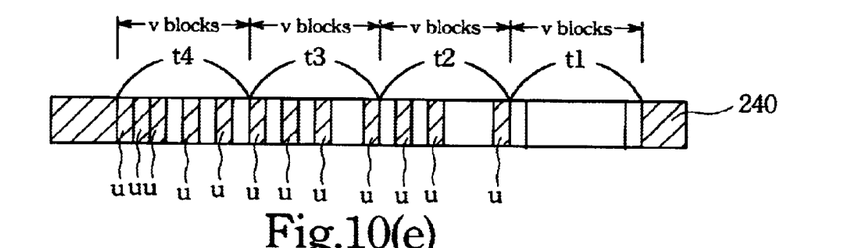

Because the width of each slit, the distance between slits, and the curvature of each slit can be varied depending to the design for the photoresist pattern, not all the masks according to the present invention are illustrated in the specification. Various kinds of masks proposed in the specification of the present invention are only a part of the embodiments of the present invention. In order to avoid using gray-level masks in the prior art to manufacture the reflector proposed in the present invention, in one preferred embodiment of the present invention, the cross section of the photoresist bump 201 is shown in FIG. 10(*a*). Accordingly, the relation of the exposure to the photoresist layer versus the position of the photoresist layer must be the same as line 210 shown in FIG. 10(*b*), in which the x-coordinate represents the lateral position of the photoresist layer, and the y-coordinate represents the exposure of the photoresist layer. In one preferred embodiment of the present invention, on the mask 10 (turning to FIG. 7(*a*)), assume each of the plurality sets of slits 11 has four slits, the projection of line 210 on the x-coordinate can be divided into four portions having the same width. The first portion x1, the second portion x2, the third portion x3, and the fourth portion x4 are of the same width, and exposures corresponding to each portion are different, as shown in FIG. 10(*b*).

Then the total exposure of each portion (the first portion x1, the second portion x2, the third portion x3, and the fourth portion x4) is summarized, and the acquired summations are divided by the length of each portion. Thus the average exposure p1, q1, r1, and s1 corresponding to the first portion x1, the second portion x2, the third portion x3, and the fourth portion x4 are acquired respectively. So the piecewise simulated plot emulating the average exposure of the photoresist pattern versus each section on the x-coordinate according to the preferred embodiment of the present invention is illustrated in FIG. 10(*c*). Next, and referring to FIG. 10(*d*), an assumption is made that each portion containing a slit is of the width p2, so the transparent area of the slit resulting in the maximum average exposure p1 is of the width p2. The transparent area of the portion containing the slit resulting in average exposure q1 is of the width q2. The transparent area of the portion containing the slit resulting in average exposure r1 is of the width r2, and the transparent area of the portion containing the slit resulting in average exposure s1 is of the width s2. Because the exposure is in proportional to the width of the transparent area (slit) of the portion, it is obvious that (q2)/(p2)=(q1)/(p1), (r2)/(p2)=(r1)/(p1), (s2)/(p2)=(s1)/(p1). According to the relation mentioned above, the width of each slit of the plurality sets of slits on the mask 220 is obtained. The photoresist layer is then exposed to an exposure system under defocus condition using mask 220 as a mask, and thus the photoresist pattern shown in FIG. 7(*b*) is obtained. The processes utilized in the following process as described in the following figures is employed to proceed with the photoresist pattern shown in FIG. 7(*b*), and obtains the substrate (denoted 150 in FIG. 9) of the reflector used in the liquid crystal display (LCD). Then use the process described in FIG. 9 is used to manufacture a LCD.

In the other preferred embodiment of the present invention, the cross-section of the photoresist bump 201 is shown in FIG. 10(*a*). Accordingly, the relation of the exposure to the photoresist layer versus the position of the photoresist layer must be the same as the line 210 that is shown in FIG. 10(*b*). The x-coordinate represents the lateral position of the photoresist layer, and the y-coordinate represents the exposure of the photoresist layer. In the other preferred embodiment of the present invention, on the mask 10 (turning to FIG. 7(*a*)), assume each set of the plurality sets of slit 11 have four slits, the projection of line 210 on the x-coordinate can be divided into four portions having the same width. The first portion x1, the second portion x2, the third portion x3, and the fourth portion x4 are of the same width, and the resulting exposure corresponding to each portion is different, as shown in FIG. 10(*b*).

Then the total exposure of each portion (the first portion x1, the second portion x2, the third portion x3, and the fourth portion x4) is summarized, and the acquired summations are divided by the length of each portion. Thus the average exposure p1, q1, r1, and s1 corresponding to the first portion x1, the second portion x2, the third portion x3, and the fourth portion x4 are acquired respectively. So the piecewise simulated plot emulating the average exposure of the photoresist pattern versus each section on the x-coordinate according to the other preferred embodiment of the present invention is illustrated in FIG. 10(*c*). Next, and referring to FIG. 10(*e*), an assumption is made that the first region t1 on mask 240 resulting in the maximum average exposure p1 has v blocks, and the v blocks are transparent. The second region t2 on mask 240 resulting in the average exposure q1 has v blocks, and the number of oblique block u is assumed to be k2, so (v-k2)/v=(q1)/(p1). Similarly, the third region t3 on the mask 240 resulting in the average exposure r1 has v blocks, and the number of oblique block u is assumed to be m2, so (v-m2)/v=(r1)/(p1). The fourth region t4 on the mask 240 resulting in the average exposure s1 has v blocks, and the number of oblique block u is assumed to be n2, so (v-n2)/v=(s1)/(p1). It is obvious that the exposure is in proportional to the number of transparent block in a portion containing a slit on the mask, considering together with the ration mentioned above, the number of transparent blocks in each portion containing a slit is obtained. So the number of transparent blocks and oblique blocks in each slit of the plurality set of slits are obtained, and the mask 240 according to the other preferred embodiment of the present invention is obtained. Then the photoresist layer is exposed to an exposure system under defocus condition using mask 240 as a mask, and thus the photoresist pattern shown in FIG. 7(*b*) is obtained. The processes utilized in the following process as described in the following figures are employed to proceed with the photoresist pattern shown in FIG. 7(*b*), and the substrate (denoted 150 in FIG. 9) of the reflector used in the liquid crystal display (LCD) is thus obtained. Then the process described in FIG. 9 is used to manufacture an LCD.

As will be understood by persons skilled in the art, the foregoing preferred embodiments of the present invention are illustrative of the present invention rather than limiting of the present invention. Having described the invention in connection with a preferred embodiments, the modification will now suggest itself to those skilled in the art. When the ration of the transparent area to the oblique area is utilized to control the various exposures on different positions of a photoresist pattern, which is used to fabricate a reflector of a LCD using one-step-exposure method, the modification will suggest itself to those skilled in the art. While the preferred embodiments of the invention have been illustrated and described, it will be appreciated that various changes and applications of the present invention can be made therein without departing from the spirit and scope of the invention.

What is claimed is:

1. A method for fabricating diffusive-type light reflector, said diffusive-type light reflector being used for scattering incident light into a predetermined angular area away from specular ray, said method comprising:

forming a photoresist layer on a substrate;

exposing said photoresist layer under defocus exposure through a slit-width-adjusting mask, said slit-width-adjusting mask comprising a plurality sets of slit, each set of slit comprising several portions having width p2, each portion comprising a slit, a first portion under light source of said defocus exposure having a first exposure p1, a second portion under light source of said defocus exposure having a second exposure q1, transparent area within said second portion having width of q2, said first exposure p1 being greater than said second exposure q1, and (q2)/(p2)=(q1)/(p1);

baking said photoresist layer;

developing said photoresist layer to form a photoresist pattern, said photoresist pattern comprising a plurality of bumps, each of said plurality of bumps comprising a first surface and a second surface, said first surface having a longer slant than said second surface, a first angle φ between said first surface and said substrate being unequal to a second angle θ between said second surface and said substrate; and forming a reflective layer on said photoresist pattern, a normal direction of said first surface being pointing to a predetermined direction enabling reflective light of said incident light reflected by said reflective layer scattered into said predetermined angular area.

2. The method as claim 1 further comprising a baking process after said developing process, said baking process being used to smooth edges of said photoresist pattern.

3. The method as claim 1, wherein a curve of said first surface in an incident plane including said incident light is monotonically convex.

4. The method as claim 1, wherein the curve of said first surface in the incident plane including said incident light is monotonically concave.

5. The method as claim 1, wherein each of said plurality of bumps having straight edges resulting form straight slits of said slit-width-adjusting mask.

6. The method as claim 1, wherein each of said plurality of bumps having curved edges resulting form curve slits of said slit-width-adjusting mask.

7. A method for fabricating diffusive-type light reflector, said diffusive-type light reflector being used for scattering incident light into a predetermined angular area away from specular ray, said method comprising:

forming a photoresist layer on a substrate;

using an exposing step to expose said photoresist layer;

exposing said photoresist layer under defocus exposure through a slit-width-adjusting mask, said slit-width-adjusting mask comprising a plurality sets of slit, each set of slit comprising several portions having width p2, each portion comprising a slit, a first portion under light source of said defocus exposure having a first exposure p1, a second portion under light source of said defocus exposure having a second exposure q1, transparent area within said second portion having width of q2, said first exposure p1 being greater than said second exposure q1, and (q2)/(p2)=(q1)/(p1);

baking said photoresist layer;

developing said photoresist layer to form a photoresist pattern, said photoresist pattern comprising a plurality of pumps, each of said plurality of pumps comprising a first flat portion and a second flat portion, altitude of said first flat portion being higher than altitude of said second flat portion, said first flat portion being adjacent to said second flat portion; and baking said developed photoresist pattern, edges of each of said plurality of pumps of said photoresist pattern being smoothed, each of said plurality of baked pumps comprising a first surface and a second surface, said first surface being longer than said second surface, a first angle between said first surface and said substrate being unequal to a second angle between said second surface and said substrate, said plurality of pumps being randomly distributed on said substrate; and forming a reflective layer on said photoresist pattern, a normal direction of said first surface being pointing to a predetermined direction enabling reflective light of said incident light reflected by said reflective layer scattered into said predetermined angular area.

8. The method as claim 7, wherein a curve of said first surface in an incident plane including said incident light is monotonically convex.

9. The method as claim 7, wherein the curve of said first surface in the incident plane including said incident light is monotonically concave.

10. The method as claim 7, wherein each of said plurality of bumps having straight edges resulting form straight slits of said slit-width-adjusting mask.

11. The method as claim 7, wherein each of said plurality of bumps having curved edges resulting form curve slits of said slit-width-adjusting mask.

12. A method for fabricating diffusive-type light reflector, said diffusive-type light reflector being used for scattering incident light into a predetermined angular area away from specular ray, said method comprising:

forming a photoresist layer on a substrate;

exposing said photoresist layer under defocus exposure through a slit-width-adjusting mask, said slit-width-adjusting mask comprising a plurality sets of slit, each set of slit comprising several portions having v blocks, a first portion comprising v transparent blocks, a second portion comprising k oblique blocks, said first portion under light source of said defocus exposure having a first exposure p1, said second portion under light source of said defocus exposure having a second exposure q1, said first exposure p1 being greater than said second exposure q1, and (v-k)/(v)=(q1)/(p1);

baking said photoresist layer;

developing said photoresist layer to form a photoresist pattern, said photoresist pattern comprising a plurality of bumps, each of said plurality of bumps comprising a first surface and a second surface, said first surface having a longer slant than said second surface, a first angle φ between said first surface and said substrate being unequal to a second angle θ between said second surface and said substrate; and forming a reflective layer on said photoresist pattern, a normal direction of said first surface being pointing to a predetermined direction enabling reflective light of said incident light reflected by said reflective layer scattered into said predetermined angular area.

13. The method as claim 12 further comprising a baking process after said developing process, said baking process being used to smooth edges of said photoresist pattern.

14. The method as claim 12, wherein a curve of said first surface in an incident plane including said incident light is monotonically convex.

15. The method as claim 12, wherein the curve of said first surface in the incident plane including said incident light is monotonically concave.

16. The method as claim 12, wherein each of said plurality of bumps having straight edges resulting form straight slits of said slit-width-adjusting mask.

17. The method as claim 12, wherein each of said plurality of bumps having curved edges resulting form curve slits of said slit-width-adjusting mask.

* * * * *